United States Patent [19]

Langlois et al.

[11] Patent Number: 4,971,542

[45] Date of Patent: Nov. 20, 1990

[54] BLOW MOLDING MACHINE WITH ACCUMULATOR CUSHION REGULATION

[75] Inventors: Jacques A. E. Langlois, Vellmar; Heinrich M. G. Bergmann; Wolfgang Nuhn, both of Kassel, all of Fed. Rep. of Germany

[73] Assignee: U. S. Philips Corporation, New York, N.Y.

[21] Appl. No.: 325,633

[22] Filed: Mar. 20, 1989

[30] Foreign Application Priority Data

Mar. 24, 1988 [DE] Fed. Rep. of Germany ....... 3809857

[51] Int. Cl.$^5$ ............................................. B29C 49/04
[52] U.S. Cl. .................................. 425/147; 264/40.7; 264/541; 425/140; 425/145; 425/150; 425/161; 425/166; 425/381; 425/532
[58] Field of Search ............... 425/147, 149, 150, 145, 425/131.1, 522, 532, 381, 140, 161, 166; 264/40.4, 40.7, 540, 541

[56] References Cited

U.S. PATENT DOCUMENTS

| | | | |
|---|---|---|---|
| 3,759,648 | 9/1973 | Hunkar | 425/140 |
| 3,767,339 | 10/1973 | Hunkar | 425/145 |
| 3,865,528 | 2/1975 | Roess | 425/145 |
| 4,179,251 | 12/1979 | Hess et al. | 425/532 X |
| 4,338,071 | 7/1982 | Daubenbuchel et al. | 425/145 X |
| 4,594,065 | 6/1986 | Langlois et al. | 425/150 |
| 4,678,420 | 7/1987 | Inoue | 425/145 |

FOREIGN PATENT DOCUMENTS 3416781 11/1985 Fed. Rep. of Germany .

Primary Examiner—James C. Housel
Attorney, Agent, or Firm—Jack D. Slobod

[57] ABSTRACT

The invention relates to a blow molding machine for the blow molding of hollow articles, with an accumulator head (1) for producing a preform and with a blow mold for forming a hollow article from the preform. After completion of a blow molding sequence, a piston positioning signal is derived by a control system (15), to regulate the position of a discharge piston (4) in the accumulator head (1), from a comparative signal of the actual position and set position of the discharge piston (4). The set position is determined by integration from a previously specified speed set point profile. The control system (15) further superimposes an influx signal on the comparative signal, which corresponds to the change in volume of plastic flowing from an extruder (2) to replace the discharged contents of the accumulator head (1). The deviation between an actual cushion and a set point cushion for the plastic remaining in the accumulator head at the end of the discharge step is reduced by regulating the rotational speed of the extruder.

6 Claims, 1 Drawing Sheet

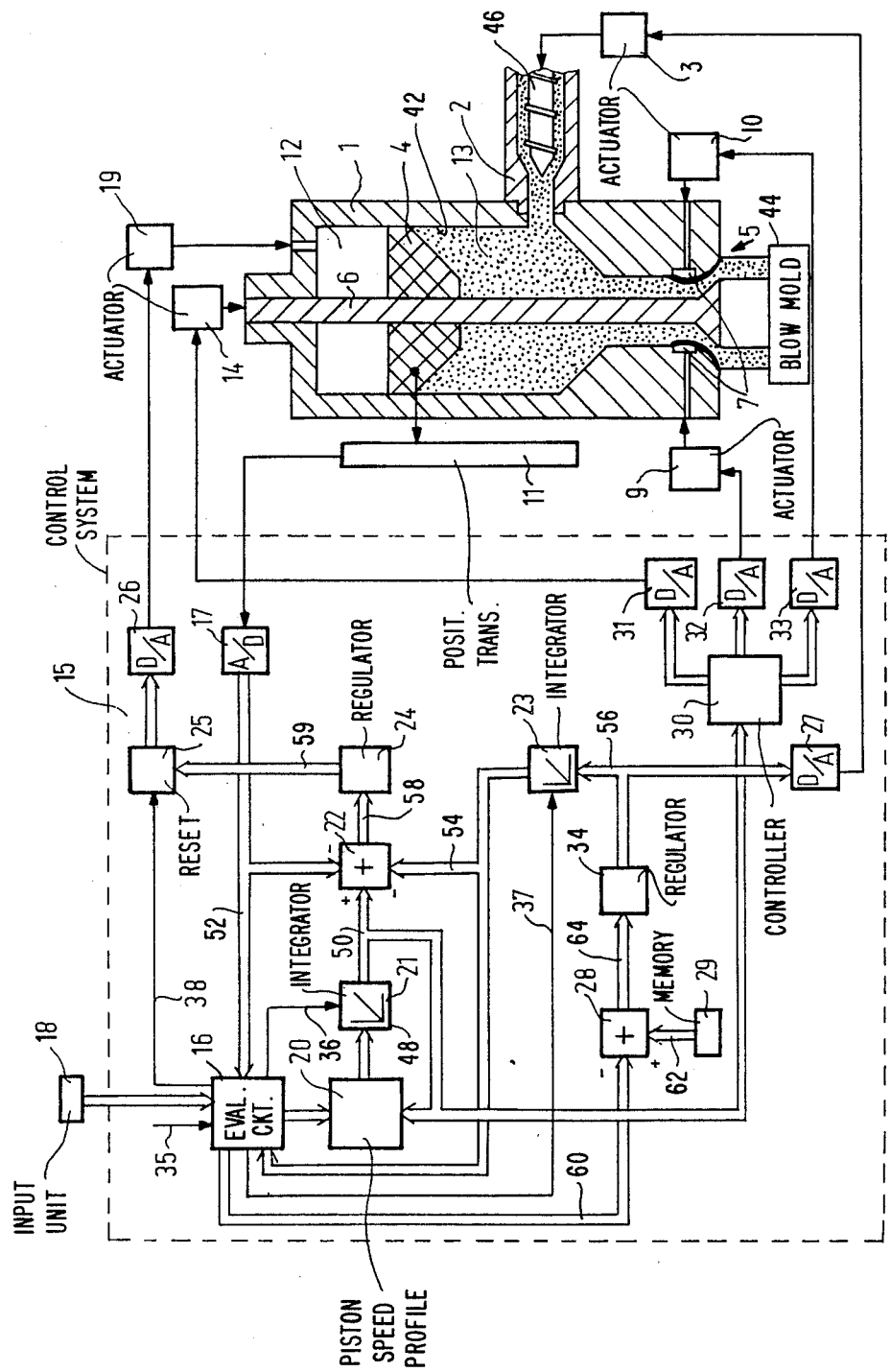

BLOW MOLDING MACHINE WITH ACCUMULATOR CUSHION REGULATION

BACKGROUND OF THE INVENTION

1. Related Application

This application is related in subject matter to commonly owned application Ser. No. 07/326,581 filed Mar. 21, 1989 by the same inventors as herein entitled "Blow Molding Machine For The Blow Molding Of Hollow Articles With Waiting Time Control."

2. Field of The Invention

The invention relates to a blow molding machine for the blow molding of hollow articles, with an accumulator head, which is connected to an extruder supplying synthetic material such as plastic, and from which in the filled condition a discharge piston drives the plastic through an annular slit-shaped discharge opening to produce a preform, with a blow mold for forming a hollow article from the preform and with a control system which, after completion of a blow molding sequence, derives a piston positioning signal for regulating the position of the discharge piston from a comparative signal, which is formed from the difference between the actual position and the set position of the discharge piston, the set position being determined by integration from a previously specified speed set point profile.

3. Description of the Prior Art

In order to blow mold hollow articles from thermoplastic synthetic material, tubular shaped preforms are produced from the relevant plastic material using an accumulator head and in a further operation are inflated between two hollow mold halves (blow mold) to the final size. The accumulator head is connected to an extruder, from which the thermoplastic synthetic material reaches the accumulator head. The accumulator head has an annular slit-shaped discharge opening, which is adjustable. The thermoplastic material is driven out of the discharge opening by a discharge piston. The preform which results in this way is stretched nonuniformly depending on the shape of the hollow article to be obtained. Thus, a uniform wall thickness of the hollow article requires a profiling of the wall thickness in the preform (wall thickness set point profile). This wall thickness set point profile of the preform is produced by adjusting the slit width of the discharge opening during the discharge step and altering the speed of the discharge piston in the discharge stroke. A blow molding machine working in this manner is known from German Offenlegungsschrift No. 3,416,781.

During a discharge step the speed of the discharge piston is determined by regulating the position of the discharge piston. A piston actuator displaces the discharge piston depending on the piston positioning signal of a position regulator. The position regulator receives a comparative signal, which is formed in a superimposition stage by subtraction of the actual position from the set position. Here, the set position is determined by integration from a previously specified speed set point profile. The speed set point profile is divided into a certain number of segments, which define various positions. An alteration in the speed may occur from one segment to the next. This speed curve which has been preselected by the profile corresponds to the profile for the wall thickness control at the discharge opening.

The speed set point profile is determined for a certain volume within the accumulator head. If the volume of plastic within the accumulator head remains constant in successive discharge steps, a preform is produced (reference preform) which essentially exhibits the same features, namely constant length and constant volume. Here, it is necessary that the influx of plastic from the extruder remains constant. If this influx of plastic varies, e.g. by alteration of the rotational speed of the extruder, the discharged tube also varies.

Normally the discharge step begins when the accumulator head is filled with thermoplastic material (until the set point contents level is reached) and the blow molding sequence for producing a hollow article is complete. If the blow molding sequence is not yet finished, the accumulator head continues to be filled with plastic, until after the conclusion of the blow molding sequence the discharge step can begin. The additional influx of plastic caused by the overfilling of the accumulator head causes variations in the preform. Profiling of the preform is only undertaken when the additional plastic has been discharged as a so-called "run-in tube". A waiting time also arises when the blow molding sequence is complete, but the accumulator head is not yet completely filled to its set point contents level. A loss of material and a reduction in the number of hollow articles which can be produced per unit time (reduction in capacity) results from the waiting time between completion of the blow molding sequence and reaching the set point contents level in the accumulator head and vice versa.

SUMMARY OF THE INVENTION

The object of the invention is therefore to provide a blow molding machine for the blow molding of hollow articles, in which a loss of material is reduced and the number of hollow articles which can be produced per unit time is increased, the preform resulting from the discharge step substantially corresponding to a reference preform.

This object is achieved with a blow molding machine of the type initially mentioned, in that the control system superimposes an influx signal on the comparative signal, which corresponds to the change in volume of plastic flowing from the extruder to replace the discharged contents of the accumulator head, and reduces the deviation between an actual cushion and a set point cushion for the plastic remaining in the accumulator head at the end of the discharge step by regulating the rotational speed of the extruder.

With this blow molding machine a preform is produced which substantially corresponds to the reference preform even when the influx from the extruder varies. The speed set point profile is determined for a constant volume in the accumulator head. This requires that a constant influx of thermoplastic material comes out of the extruder. A constant set point contents level, at which the discharge step begins, and a set point cushion with which the discharge step ends have been determined for this speed set point profile. The alteration of the influx of plastic from the extruder is compensated by an influx signal, which is superimposed on the comparative signal. The influx signal is previously specified for the reference preform. It corresponds to the quantity of thermoplastic synthetic material which flows into the accumulator head during the formation of a reference preform. This influx signal affects the set position of the discharge piston in such a way that the plastic which has flowed from the extruder in a greater or lesser amount during the discharge step cannot alter the volume of the preform. Only that plastic is discharged which corresponds to the volume of the reference preform.

The control system compares the plastic still remaining after a discharge step (actual cushion) with the set point cushion. Depending on the comparison, the positioning signal is derived for regulating the rotational speed of the extruder, in order to achieve a convergence of the actual cushion with the set point cushion. This discharge step begins as soon as the blow molding sequence is finished. If the set point contents level has not yet been reached at the beginning of the discharge step, the actual cushion after the discharge step is smaller than the set point cushion. An increase in the rotational speed is necessary in this case. A reduction in the rotational speed is necessary when the set point contents level at the beginning of the discharge step has been exceeded. By this measure it is ensured that the preform substantially corresponds to the reference parison and the actual cushion has converged with the set point cushion. Regulation is such that the plastic remaining in the accumulator head (cushion) remains substantially constant and also the residence time of the plastic. This enables reproducible preforms to be produced. Neither is any "run-in tube" discharged. Thus the loss of material is reduced and the number of hollow articles which can be produced per unit time is increased.

In a first embodiment of the invention it is arranged that the control system
  subtracts the actual cushion by subtraction of the influx signal value measured at the end of a discharge step from the set point value for the final position,
  forms a differential signal between a set point cushion and the actual cushion and
  generates a rotational speed set point signal, for an extruder actuator in order to set the rotational speed, from the differential signal by differentiation and integration.

The set point value for the final position determined at the end of a discharge step by integration from the speed set point profile does not correspond to the actual cushion. After generating the comparative signal by forming the difference between the actual position and the set position this is additionally superimposed on an influx signal. This influx signal must therefore be taken into account when determining the actual cushion from the set point value for the final position. After determining the actual cushion and forming the differential signal, the rotational speed set point signal for the extruder positioning actuator is formed by differentiation and integration. It is also possible to determine the actual cushion by measuring the position value of the discharge piston at the end of the discharge step.

The influx signal is formed in the control system from the rotational speed set point signal by integration. As the volume is proportional to the integrated flow of plastic per unit time, while the flow is proportional to the rotational speed and the rotational speed is in turn proportional to the rotational speed set point signal, the influx signal results by integration from the rotational speed set point signal. With each new discharge step the integrator must be set to zero, since the added quantity of plastic at the beginning of the discharge step is equal to zero.

The discharge piston is regulated between the beginning of the discharge step and reaching the set point value for the final position. Here, a piston actuator is provided which positions the discharge piston depending on the piston positioning signal in order to regulate the discharge piston. After the set point value for the final position has been reached the piston actuator, by means of a reset signal from the control system, brings about a return of the discharge piston to its initial position by filling the accumulator head from the extruder.

The control system may be produced as a digital calculating device (microcomputer) or by means of discrete components. For the generation of the rotational speed set point signal by means of discrete components the control system contains a differential integral regulator which generates the rotational speed set point signal for the extruder actuator from the differential signal formed in a comparative stage. Moreover, the control system contains a first integrator for forming the influx signal from the rotational speed set point signal for the extruder actuator.

The control system further contains an evaluation circuit, which
  causes the discharge piston to begin moving after completion of a blow molding sequence and
  determines the set point value for the final position and the actual cushion.

A further circuit controlled by the evaluation circuit supplies the speed set point profile. A second integrator connected downstream integrates the speed set point values, which are fed to a superimposition stage, in which the difference between the actual position and the set position and the superimposition of the comparative signal and the influx signal is formed. The piston positioning signal supplied by the control system is generated by a position regulator, which receives the signal formed by the superimposition stage.

BRIEF DESCRIPTION OF THE DRAWING

The sole FIGURE of the drawing is a schematic representation of the blow molding machine according to the present invention.

DETAILED DESCRIPTION OF THE PREFERRED EMBODIMENTS

The blow molding machine shown schematically in the sole FIGURE contains an accumulator head 1 having an elongated chambertz for thermoplastic synthetic material 13, which sequentially produces preforms made from plastic 13 which are discharged to a blow mold 44. The blow mold 44 which is only shown as a block, has the function of pressing the preforms to form hollow articles. The thermoplastic synthetic material 13 is supplied from an extruder 2, which is controlled by an extruder actuator 3. The extruder actuator 3 adjusts the rotational speed of the extruder screw 46 and thereby determines the flow of the thermoplastic material 13 flowing into the chamber 42 of accumulator head 1. The thermoplastic material 13 which has entered the generally cylindrical chamber 42 from the extruder 2 is driven out through an annular slit-shaped discharge opening 5 at one end of chamber 42 by a discharge piston 4. The slit width is continually adjusted by a mandrel 6. The wall thickness of a parison can further be partially adjusted by means of an adjustable die ring 7 by several actuators (partial wall thickness adjustment). In the drawing, as an example the die ring 7 is adjusted by two wall thickness actuators 9 and 10. The mandrel 6 is adjusted by a mandrel actuator 14.

The position of the discharge piston 4, which is actuated by a piston actuator 19 (hydraulic actuator), is measured by means of a position transducer 11. The discharge under pressure of the thermoplastic material 13 through the annular slit-shaped discharge opening 5 by means of the discharge piston 4 is accomplished by filling the hollow chamber 12 of the accumulator head 1, which is at the back end of piston 4, and therefore not filled with thermoplastic plastic 13, with hydraulic oil. When the discharge step is finished, the hydraulic oil flows out of the hollow chamber 12 again, and the discharge piston 4 is raised to its initial position by the thermoplastic material 13 supplied from the extruder 2.

The accumulator head 1 is regulated and controlled by a control system 15, which is constructed from discrete digital components. The control system 15 contains an evaluation circuit 16, to which the actual position of the discharge piston 4, determined by the position transducer 11, is supplied via an analog-digital converter 17. The set point, contents level, and the set point cushion are fed to the evaluation circuit 16 via an input unit 18. The set point cushion represents the residual plastic 13 remaining in the accumulator head 1 at the end of a discharge step. The evaluation circuit 16 receives a further status signal from a blow mold control system via a line 35, which indicates whether the blow mold is ready to receive a new preform (the blow molding sequence is complete). The evaluation circuit further receives an influx signal value at the end of a discharge step.

If the evaluation circuit 16 establishes that the blow mold is ready to accept a new preform, a starting signal is supplied to a circuit 20, whereupon this generates a speed set point profile. The circuit 20 receives the set point values for the initial position and the final position from the evaluation circuit 16 before the beginning of the discharge step. The speed set point profile has been determined for a reference preform and represents the speed of the discharge piston depending on the position of the discharge piston 4 between the set point contents level and the set point cushion. The speed set point profile is divided into individual segments which define various positions. The speed may vary linearly from segment to segment. The blow molding sequence may have finished earlier or later than the filling of the accumulator head 1 up to the set point contents level. In these cases the discharge step does not begin at the set point contents level. The set point value for the initial position is thus the actual position at the end of the blow molding sequence. The evaluation circuit 16 determines the set point value for the final position by the following calculation: First the set point stroke is formed by subtraction of the set point cushion from the set point contents level. Then the set point value for the final position is determined by a further subtraction of the set point stroke from the set point value for the initial position.

The speed set point value output by the circuit 20 on line 48 is integrated in an integrator 21 and fed on line 50 as the set position to a superimposition or addition/subtraction stage 22. The set position supplied by the integrator 21 is fed back to the circuit 20 and serves to alter the speed set point profile depending on the set position. If the circuit 20 establishes that the set point value for the final position has been reached, the output of the speed set point profile is terminated. The integrator 21 is set to the actual position by the evaluation circuit 16 via the line 36 before the beginning of a discharge step.

Moreover, the superimposition stage 22 receives the actual position on line 52 from the analog-digital converter 17 and an influx signal on line 54 from a further integrator 23. The influx signal is formed for the extruder actuator 3 by integration of the rotational speed set point signal on line 56 in the integrator 23. The influx signal and the actual position are subtracted from the set position in the superimposition stage 22. The error signal on line 58 resulting from the subtraction is supplied to a position regulator 24 which generates a piston positioning signal on line 59, which is supplied to the piston actuator 19 via a reset circuit 25 and a digital-analog converter 26. A signal is fed from the evaluation circuit 16 via a line 38 to the reset circuit 25, which has the effect that at the beginning of the discharge step the piston positioning signal is fed to the piston actuator 19. At the end of the discharge step the piston actuator 19 is controlled in such a way that the discharge piston 4 returns to its initial position by the chamber 42 of accumulator head 1 being filled with thermoplastic material. Even when the discharge piston 4 has completely driven out the plastic 13 from the accumulator head 1, i.e. the discharge piston 4 has reached the mechanical stop of the accumulator head 1, the evaluation circuit 16 brings about a return of the discharge piston 4 to its initial position by means of a signal to the return circuit 25 via the line 38.

A certain volume within the accumulator head 1 and a certain influx of plastic from the extruder 2 during the discharge step have been determined for the reference preform. Since during the discharge step the plastic supplied from the extruder 2 can vary, the set position must then be compensated in order to produce a preform which corresponds to the reference preform. The volume of plastic, which flows into the accumulator head 1 to a greater or lesser extent during the discharge step, is proportional to the integrated influx per unit time of the plastic. This flow is in turn proportional to the rotational speed and the rotational speed is proportional to the rotational speed set point signal. By integration of the rotational speed set point signal in the integrator 23 an influx signal is thus produced, which corresponds to the volume flowing in during the discharge step. The integrator 23 is set to zero before the beginning of a discharge step by a resetting signal from the evaluation circuit 16 via the line 37.

Regulation of the rotational speed of the extruder 2 is provided, in order to ensure that the preform corresponds substantially to the reference preform. At the same time it is ensured that the discharge step begins at set point contents level and ends at set point cushion. At the end of a discharge step the actual cushion is determined in the evaluation circuit 16. In doing this the evaluation circuit 16 calculates the actual cushion by subtraction of the influx signal value measured at the end of the discharge step from the set point value for the final position. The set point value for the final position is, as already stated, the set position of the speed set point profile at the end of the profile output. It is thus the value which is fed to the superimposition stage 22 by the integrator 23 at the end of the profile output. The actual cushion is fed on line 60 to an input of a comparative stage 28, to whose other input the set point cushion is fed on line 62 by a memory element 29. In the comparative stage 28 the differential signal between the set point cushion and the actual cushion is formed by subtraction of the actual cushion from the set point cushion. The differential signal is fed on line 64 to a differential integral regulator 34 which generates the rotational speed set point signal on line 56 which is fed to the integrator 23 and via a digital-analog converter 27 to the extruder actuator 3. It is ensured by means of this regulator 34 that the actual cushion converges with the set point cushion. Investigations have shown that the closed loop control system is stable.

The wall thickness actuators 9 and 10 and the mandrel actuator 14 are controlled by a circuit 30, which supplies the individual set point values (wall thickness set point profiles) for the mandrel positioning and the wall thicknesses via digital-analog converters 31, 32 and 33 depending on the set position.

We claim:

1. A blow molding machine for the blow molding of hollow articles, comprising: an accumulator head (1), which is connected to an extruder supplying synthetic material (13), and from which in the filled condition a discharge piston (4), in a discharge step, drives the synthetic material through an annular slit-shaped discharge opening (5) to produce a preform;
   a blow mold means for forming a hollow blown article from the preform; and
   a control means (15) which, after completion of a blow molding sequence, derives a piston positioning signal for regulating the position of the discharge piston (4) from a comparative signal, which is formed from the difference between the actual position and a set position of the discharge piston (4), the set position being determined by integration from a previously specified speed set point profile, said control means (15) including:
   means for superimposing an influx signal on the comparative signal, which corresponds to the change in volume of synthetic material flowing from the extruder (2) to replace the discharged contents of the accumulator head (1); and
   means for reducing the deviation between an actual cushion and a set point cushion for the synthetic material remaining in the accumulator head at the end of the discharge step by regulating the rotational speed of the extruder.

2. The blow molding machine according to claim 1, wherein the control means (15) further includes:
   means for obtaining the actual cushion by subtraction of the influx signal value measured at the end of a discharge step from the set point value for the final position;
   means for forming a differential signal between the set point cushion and the actual cushion; and
   means for generating a rotational speed set point signal, for an extruder actuator (3) in order to set the rotational speed, from the differential signal by differentiation and integration.

3. The blow molding machine according to claim 2, wherein the control means (15) further includes means forming the influx signal from the rotational speed set point signal by integration.

4. The blow molding machine according to claim 3, further includes a piston actuator (19) which positions the discharge piston (4) depending on the piston positioning signal in order to regulate the position of the discharge piston and in that the piston actuator brings about a return of the discharge piston to its initial position in response to a reset signal from the control system (15) after the set point value for the final position has been reached by filling the accumulator head (1) from the extruder (2).

5. The blow molding machine according to claim 2, wherein the control means (15) further includes a differential integral regulator (34) which generates the rotational speed set point signal for the extruder actuator (3) from the differential signal formed in a comparative stage (28).

6. A blow molding apparatus comprising:
   a blow mold means for receiving a preform of synthetic material and in a blow molding sequence, forming a hollow blown article from the preform;
   an accumulator head having an elongated chamber for said material and an annular slit-shaped discharge opening at one end of the chamber, communicating with the blow mold means;
   an extruder communicating with said chamber for influx of said material thereto, said extruder having a controllable speed which determines the rate of said influx to said chamber.
   a discharge piston controllably positionable longitudinally in said chamber for selectively and controllably discharging synthetic material from said chamber through said discharge opening in the form of a preform during a stroke of said piston; and
   control means responsive to the completion of a blow molding sequence for deriving signals for positioning said piston while controlling the sped of said extruder to approach a set point cushion of synthetic material remaining in said chamber at the end of said stroke, said control means including:
   means for forming a desired speed set point profile of said piston for said stroke;
   means for integrating said speed set point profile to form a piston position set point profile;
   means for forming a signal indicative of the actual position of said piston;
   means for forming an influx signal indicative of an integrated speed of said extruder; and
   means for superimposition of said piston position set point profile, said actual piston position signal, and said influx signal to form an error signal for positioning said piston.

* * * * *